April 4, 1967   R. J. OLANDER   3,312,493
DOOR FASTENER
Filed Aug. 2, 1965
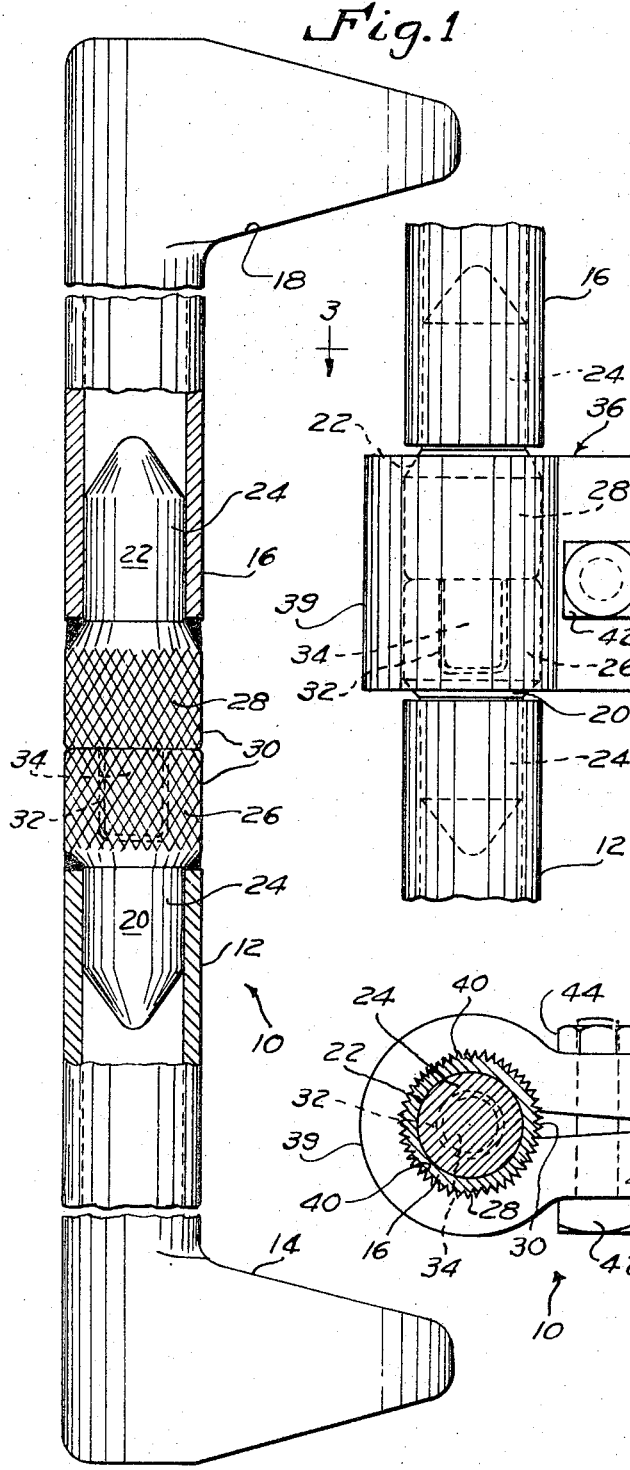
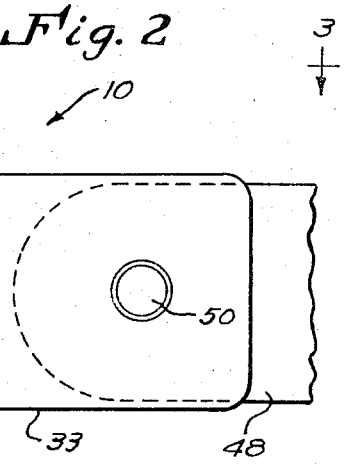
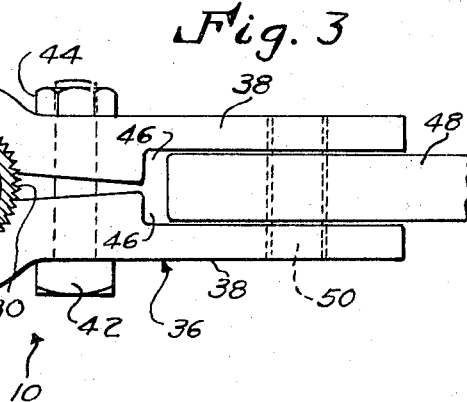
INVENTOR.
Roland J. Olander
BY Edward F. Jurow
Atty.

United States Patent Office 3,312,493
Patented Apr. 4, 1967

3,312,493
DOOR FASTENER
Roland J. Olander, La Grange, Ill., assignor to W. H. Miner, Inc., Chicago, Ill., a corporation of Delaware
Filed Aug. 2, 1965, Ser. No. 476,268
10 Claims. (Cl. 292—218)

This invention relates in general to a door fastener for use with doors on freight conveyances or other cargo containers and more particularly to an improved arrangement for adjustably assembling a door fastener thereon, which arangement includes an adjustable lever mount.

Door fasteners for truck trailers and the like usually employ a vertically extending rotary locking bar mounted on the door and having cams at the opposite ends thereof for engagement with respective keepers mounted on the trailer body to latch the cargo space door. The bar has a handle located intermediate its ends permitting manual rotation of the bar to bring the cams either into or out of engagement with the keepers. In such an arrangement it is not only necessary that the cams engage their keepers simultaneously so that the door is latched at both top and bottom, but the handle must then be in a position generally flush with the door so that it may engage the usual sealing plate carried on the trailer door to prevent movement of the handle from its locked position without actual manual disengagement of the handle from the sealing plate.

Alignment of the keepers and cams at both ends of the bar for simultaneous engagement often presents problems since some dimensional variation in the theoretical location of the keepers and cams sometimes occurs as a result of improper or inaccurate mounting. This is further complicated by the need for the handle to engage the sealing plate when the cams are latched in their limit positions. Assembling the door fastener therefore requires considerable manipulation and adjustment of the location of the components before the assembly is satisfactorily completed.

In order to solve this problem the present invention proposes a unique and simple solution. In essence, a two-piece bar, each piece carrying a respective cam, is rotatably mounted on the door with each piece also being rotatable with respect to the other. The cams are then engaged with their keepers and when in their limit positions the bars are fixed with respect to each other so that both cams will always move into their latched or locked positions in their respective keepers simultaneously.

The means for fixing the bars with respect to each other includes a radially adjustable lever mount to which the handle is attached. The lever mount, before tightening of same, is rotatable with respect to both bars, thus permitting the lever mount to be radially adjusted so that the handle engages its sealing plate when the cams are in their latched positions. The lever mount is then securely attached to both bars, by tightening same, so that both the cams and the handle are rotatable together into their limit or latched positions. This provides a simple and effective arrangement for the alignment and adjustment of the cams and the handle without unnecessary manipulation of the elements and undue concern over the exact mounted position of the cams and keepers.

It is therefore one object of the present invention to provide an improved door fastening arrangement for the doors of cargo containers or freight conveyances such as truck trailers and the like.

It is another object of the present invention to provide an economical and easily adjusted door fastener assembly for the cargo doors of truck trailers and similar conveyances.

Other objects and features of this invention will become apparent upon examination of the following specification and claims, together with the drawings, wherein:

FIG. 1 is an elevatonal view, partially broken and partially in vertical section, illustrating the vertical two-piece bar assembly prior to assembly of the lever mount thereon;

FIG. 2 is an elevational view of the bar assembly, with the cam ends broken away, after assembly of the handle-carrying lever mount thereon; and FIG. 3 is a horizontal section taken generally on the line 3—3 of FIG. 2.

In FIGS. 1, 2 and 3 an elongated rotary locking bar door latching assembly adapted to be carried by a truck trailer door, for example, and embodying a preferred form of the invention is generally indicated by the reference character 10.

The bar assembly 10 which is adapted to be mounted in a conventional manner on the truck trailer door includes a lower vertical elongated hollow bar or tube 12 having a cam finger 14 at its lower end, and an upper elongated hollow bar or tube 16 having a cam finger 18 at its upper end. The cam fingers 14 and 18 are adapted to conventionally engage keepers (not shown) mounted on the door frame of the truck trailer or other cargo carrier above and below the door.

The tubes 12 and 16 are assembled together for radial adjustment about the colinear axes thereof by means of a lower cylindricl adjustment fitting 20 secured in the upper open end of the lower tube 12 and an upper cylindrical adjustment fitting 22 secured in the lower open end of the upper hollow tube 16. Each fitting 20 and 22 is characterized by an axially projecting cylindrical boss or nose 24 having a conically blunt end telescopically received in the open ends of the tubes 12 and 16. An enlarged head 26 is provided for the fitting 20 and an enlarged head 28 is provided for the fitting 22. The heads 26 and 28 seat against the ends of the tubes 12 and 16, respectively, and are welded thereto with the outer peripheries of the fittings being knurled, as at 30, and being generally co-extensive with the outer peripheries of the tubes. The head 26 on the fitting 20 is provided with a cylindrical axial recess 32 in which a cylindrical axial boss 34 on the head 28 is telescopically received, thus permitting relative rotational adjustment of the tubes 12 and 16 while preventing misalignment thereof. The vertical position on the door at which the fittings 20 and 22 are engaged, and thus the vertical position of the operating handle as will be explained, is determined by the relative lengths of the tubes 12 and 16, which lengths may be chosen to make the engaged fittings 20 and 22 readily accessible for adjustment and the handle accessible for operation.

After the two tubes or locking bars 12 and 16 have been properly adjusted to insure proper engagement of the cam fingers 14 and 18, respectively, thereon with their keepers (not shown), the two locking bars 12 and 16 are rigidly retained in proper radial adjustment by a clamp-like lever mount 36, as seen in FIGS. 2 and 3. The lever mount 36 comprises a pair of side legs 38 and a generally cylindrical rear leg 39 integrally joined to the side legs 38 to provide a generally U-shaped configuration. The height or vertical dimension of the rear leg 39 is sufficient to embrace both of the heads 26 and 28 of the fittings 20 and 22 and is characterized by an internal knurled surface 40 which is adapted to engage over the knurled surfaces 30 of the heads 26 and 28.

A bolt 42 extends through the two legs 38 and a nut 44 is engaged therewith for drawing the legs 38 together to tightly clamp the rear leg 39 about the fitting heads 26 and 28 thus engaging the knurled surfaces 30 and 40, whereby to retain the two locking bars 12 and 16 in their properly adjusted radial positions. The legs 38 are each provided on their inner surface with a vertically extending recess or cut-away portion 46 adjacent their ends whereby to permit the receipt of a handle 48 therebetween. The handle 48 is pivotally mounted between the legs 38 by means of a pin 50 and is adapted to rotate the bar assembly 10 to bring the cam fingers 14 and 18 into and out of engagement with their respective keepers. A sealing plate (not shown), carried by the door, is adapted to be conventionally engaged by the handle 48 when the cam fingers 14 and 18 are engaged with their keepers.

To assemble the door fastener, the two elongated tubes or locking bars 12 and 16, having respective cam fingers 14 and 18 thereon, together with fittings 20 and 22 are assembled as shown in FIG. 1 and conventionally supported for rotation in brackets (not shown) on the door. Preferably, prior to the foregoing, the lever mount 36 is slid over either one of the tubes 12 or 16 before assembly thereof. If desired, sufficient spread may be provided between the legs 38 of the lever mount 36 to permit the lever mount 36 to be slid over the tubes 12 and 16 after assembly thereof. After the assembled tubes 12 and 16 have been rotatably mounted on the door, one of the tubes 12, for example, and its cam finger 14 are rotated to lockingly engage its cam finger with its keeper while the other tube 16 remains comparatively stationary. This is permitted because the two tubes are rotatable relative to each other. The other tube 16 is then rotated to lockingly engage its cam finger 18 with its keeper.

The U-shaped lever mount 36 is now moved axially of the tubes 12 and 16 to bring the rear leg 39 across the heads 26 and 28 of the fittings 20 and 22 whereby to permit the knurled surface 40 thereon to engage the knurled surfaces 30 on the fitting heads 26 and 28. The handle 48 may be assembled on the lever mount 36 either before or after the leg 39 thereof is engaged across the fitting heads 26 and 28, depending on which method is most convenient. The handle 48 together with the lever mount 36 is then rotated relative to the lockingly engaged tubes 12 and 16 to engage the handle with its associated sealing plate (not shown) in the usual manner. Since the bolt 42 and nut 44 are loose at this time, rotation of the lever mount 36 is permitted without disturbing the position of the tubes 12 and 16. With the handle 48 engaged in its sealing plate and both cam fingers 14 and 18 engaged with their keepers so that the door fastener is in its limit or latched position, the bolt 42 and nut 44 are tightened to clamp the knurled surface 40 tightly about the knurled surfaces 30 of the fitting heads 26 and 28. The tubes 12 and 16 and the handle 48 are now rigidly connected in their limit position so that alignment of all the elements is positively secured and the cam fingers may be operated in and out of their limit or latched positions without disturbing this alignment.

If for some reason the alignment is not satisfactory, the nut 44 is simply loosened and the lever mount 36 is moved vertically to disengage it from one or both fitting heads 26 and 28. This permits additional rotary adjustment of the tubes and cam fingers to be made, whereafter the lever mount 36 is slid back over the fitting heads 26 and 28 and the nut 44 is tightened. By providing fine or coarse knurling on the surfaces, desired degrees of adjustment are easily made. It is to be understood that the outer peripheral surfaces of the fitting heads 26 and 28 and the inner gripping surface of the rear leg 39 of the lever mount 36 may also be serrated or roughened and the invention is not limited to same being knurled.

The foregoing is one embodiment of an improved door fastener in which alignment problems during assembly are considerably reduced and whose inventive concepts are believed to be set forth in the following claims.

What is claimed as new is:

1. A door fastener comprising a pair of relatively rotatable co-axial locking bars each carrying a cam for engagement with a respective keeper to latch a door in its locked position with the relative rotation between said locking bars permitting the respective cams to be separately engaged in their limit position with their respective keepers, and a lever mount strap means encircling adjacent ends of said bars and having a single tightening means for thereafter locking said bars together to permit their simultaneous rotation for either disengaging said cams from said keepers or engaging said cams with said keepers to latch said door with said cams in said limit positions.

2. The door fastener recited in claim 1 in which said locking means has a handle associated therewith and is adjustably rotatable with respect to said bars for engaging said handle with a seal plate while said cams are in said limit positions and is thereafter rigidly fixable to said bars for ensuring that said handle is engaged with said seal plate each time said cams are engaged with said keepers in said limit positions.

3. The door fastener recited in claim 1 in which each of said locking bars carries a knurled surface for simultaneous engagement with a correspondingly-shaped knurled surface on said locking means.

4. The door fastener recited in claim 1 in which said locking bars each comprise a hollow tube having a fitting secured therein and adapted to be engaged in common by said locking means, and means on said fittings for maintaining said hollow tubes in tandem coaxially aligned positions.

5. A door fastener comprising a pair of elongated tubes adapted to be rotatably carried by a door and each having a cam at one end thereof for engagement with a respective keeper to fasten said door in its locked position, a fitting for each tube at the end of each tube opposite its cam and adapted to be fastened to the respective tube, means on one fitting for co-axially and rotatably engaging the fitting on the other tube whereby said tubes are aligned along their elongated axis and rotatable with respect to each other to enable each cam to separately engage its respective keeper, and means for thereafter rigidly connecting said fittings together whereby said tubes are simultaneously rotatable for disengaging said cams from said keepers and for simultaneously engaging said cams with said keepers to latch said door in its closed position.

6. A door fastener comprising a pair of elongated locking bars adapted to be rotatably carried by a door and each having a cam at one end thereof for engagement with a respective keeper to fasten said door in its locked position, a fitting for each bar at the end thereof opposite said cam and adapted to be fastened to its respective bar, means on one fitting for co-axially and rotatably engaging the fitting on the other bar whereby said bars are aligned along their elongated axis and are rotatable with respect to each other to enable each cam to separately engage its respective keeper, and a lever mount adapted to be clamped over both fittings to thereafter permit the simultaneous rotation of said bars.

7. The fastener recited in claim 6 in which a knurled outer surface is provided on each fitting and in which a knurled inner surface on said lever mount is tightly engageable with said knurled outer surfaces on both of said fittings simultaneously.

8. The fastener recited in claim 6 in which a handle is carried by said lever mount and said lever mount, prior to clamping thereof, is rotatable with respect to said bars whereby said handle is adapted to be engaged with a seal plate carried on said door while said cams are engaged with said keepers whereafter the rigid interconnection of said bars by said lever mount permits repetitive simultaneous engagement of said cams with said keepers and said handle with said seal plate.

9. A door fastener comprising a pair of elongated locking bars adapted to be rotatably carried by a door and each having a cam at one end thereof for engagement with a respective keeper to fasten said door in its locked position, a cylindrical fitting for each bar at the end thereof opposite its cam and adapted to be fastened to its respective bar, means on one fitting for co-axially and rotatably engaging the fitting on the other bar whereby said bars are aligned along their elongated axis and are rotatable with respect to each other to enable each cam to be separately engaged with its respective keeper, a knurled outer surface on each fitting, and a U-shaped lever mount adapted to be tightened over said knurled surfaces of both of said fittings simultaneously and having a knurled inner surface corresponding to said knurled surfaces of said fittings whereby said lever mount is adapted to rigidly interconnect said fittings and said bars for simultaneous rotation.

10. A door fastener comprising a pair of elongated tubes adapted to be carried by a door and each having a cam at one end thereof for engagement with a respective keeper to fasten said door in its locked position, a cylindrical fitting for each tube with each fitting having a tapered boss projecting into the respective tube at the end opposite its cam and adapted to be fastened to its respective tube, means on one fitting for co-axially and rotatably engaging the fitting on the other tube whereby said tubes are aligned along their elongated axis and rotatable with respect to each other to enable each cam to separately engage its respective keeper, a knurled outer surface on each fitting, and a U-shaped clamp-like lever mount having an inner knurled surface adapted to be fitted over said knurled surfaces of both of said fittings simultaneously whereby a handle carried by said lever mount is adapted to be engaged with a seal plate on said door while said cams are engaged with said keepers and whereby tightening of said lever mount to said fittings thereafter rigidly interconnects said tubes and said handle to maintain said cams in an aligned position with said keepers and said handle aligned with said seal plate with each latching operation of said fasteners.

References Cited by the Examiner

UNITED STATES PATENTS

| 1,372,681 | 3/1921 | Geiger | 292—218 |
| 2,844,396 | 7/1958 | Krokos et al. | 287—54 |
| 3,099,473 | 7/1963 | Pastva | 292—218 X |

FOREIGN PATENTS

| 248,749 | 6/1926 | Italy. |
| 35,390 | 8/1913 | Sweden. |

RICHARD E. MOORE, Examiner.

EDWARD C. ALLEN, Primary Examiner.